(12) United States Patent
Specht et al.

(10) Patent No.: US 12,145,646 B2
(45) Date of Patent: Nov. 19, 2024

(54) METHOD AND ELECTRICALLY ADJUSTABLE STEERING COLUMN FOR ADJUSTING A POSITIONING UNIT OF A STEERING COLUMN

(71) Applicants: thyssenkrupp Presta AG, Eschen (LI); thyssenkrupp AG, Essen (DE)

(72) Inventors: Jean-Pierre Specht, Haag (CH); Anton Spildenner, Feldkirch (AT); Andreas Willi, Lauterach (AT)

( * ) Notice: Subject to any disclaimer, the term of this patent is extended or adjusted under 35 U.S.C. 154(b) by 0 days.

(21) Appl. No.: 18/281,878

(22) PCT Filed: Feb. 28, 2022

(86) PCT No.: PCT/EP2022/055021
§ 371 (c)(1),
(2) Date: Sep. 13, 2023

(87) PCT Pub. No.: WO2022/194526
PCT Pub. Date: Sep. 22, 2022

(65) Prior Publication Data
US 2024/0157995 A1 May 16, 2024

(30) Foreign Application Priority Data
Mar. 15, 2021 (DE) ...................... 10 2021 202 481.5

(51) Int. Cl.
*B62D 1/181* (2006.01)
*B62D 1/185* (2006.01)

(52) U.S. Cl.
CPC ............. *B62D 1/181* (2013.01); *B62D 1/185* (2013.01)

(58) Field of Classification Search
CPC .......... B62D 1/181; B62D 1/185; B62D 1/183
See application file for complete search history.

(56) References Cited

U.S. PATENT DOCUMENTS 5,164,645 A * 11/1992 Furuse ............... G05B 19/4061
318/467
2003/0192392 A1 10/2003 Gaeth
(Continued)

FOREIGN PATENT DOCUMENTS

BE 1030938 A1 * 4/2024
CN 117141566 A * 12/2023
(Continued)

OTHER PUBLICATIONS

English Translation of International Search Report issued in PCT/EP2022/055021, dated Jun. 15, 2022.

*Primary Examiner* — Drew J Brown
(74) *Attorney, Agent, or Firm* — thyssenkrupp North America, LLC

(57) ABSTRACT

The present invention relates to an electrically adjustable steering column for a motor vehicle, comprising a supporting unit, by which a positioning unit is adjustably held, an adjustment device with an adjustment motor, said adjustment device being designed for adjusting the positioning unit relative to the supporting unit, a mechanical adjustment stop, which mechanically limits an adjustment of the positioning unit in a first adjustment direction, and a control unit. The control unit is designed here to activate the adjustment motor, wherein a virtual adjustment stop is defined, said adjustment stop being located upstream of the mechanical adjustment stop with respect to the first adjustment direction. The steering column is designed here for adjusting a positioning unit.

17 Claims, 6 Drawing Sheets

(56) References Cited

U.S. PATENT DOCUMENTS

| | | |
|---|---|---|
| 2016/0200344 A1 | 7/2016 | Sugioka et al. |
| 2018/0079441 A1* | 3/2018 | Mckinzie et al. |
| 2019/0126970 A1* | 5/2019 | Cimatti ................ B62D 5/0421 |
| 2019/0135332 A1* | 5/2019 | Cimatti ................ B62D 5/0454 |
| 2021/0291890 A1 | 9/2021 | Kreutz et al. |
| 2022/0161841 A1 | 5/2022 | Kreutz et al. |
| 2023/0084605 A1 | 3/2023 | Huber |

FOREIGN PATENT DOCUMENTS

| | | | |
|---|---|---|---|
| CN | 117325927 A * | 1/2024 | ............ B62D 1/184 |
| DE | 10 2004 044 472 A1 | 3/2006 | |
| DE | 603 08 744 T2 | 10/2007 | |
| DE | 10 2017 207 561 A1 | 7/2017 | |
| DE | 10 2019 108 466 A1 | 2/2020 | |
| DE | 10 2019 201 390 A1 | 8/2020 | |
| DE | 10 2020 202 196 A1 | 8/2021 | |
| DE | 102021202481 B3 * | 12/2021 | ............ B62D 1/181 |
| EP | 0498126 A1 * | 8/1991 | |
| EP | 3 042 825 A1 | 7/2016 | |
| GB | 2621988 A * | 3/2024 | ............ B62D 1/184 |
| WO | WO-2020216819 A1 * | 10/2020 | ............ B62D 1/184 |
| WO | WO-2023031889 A2 * | 3/2023 | |

* cited by examiner

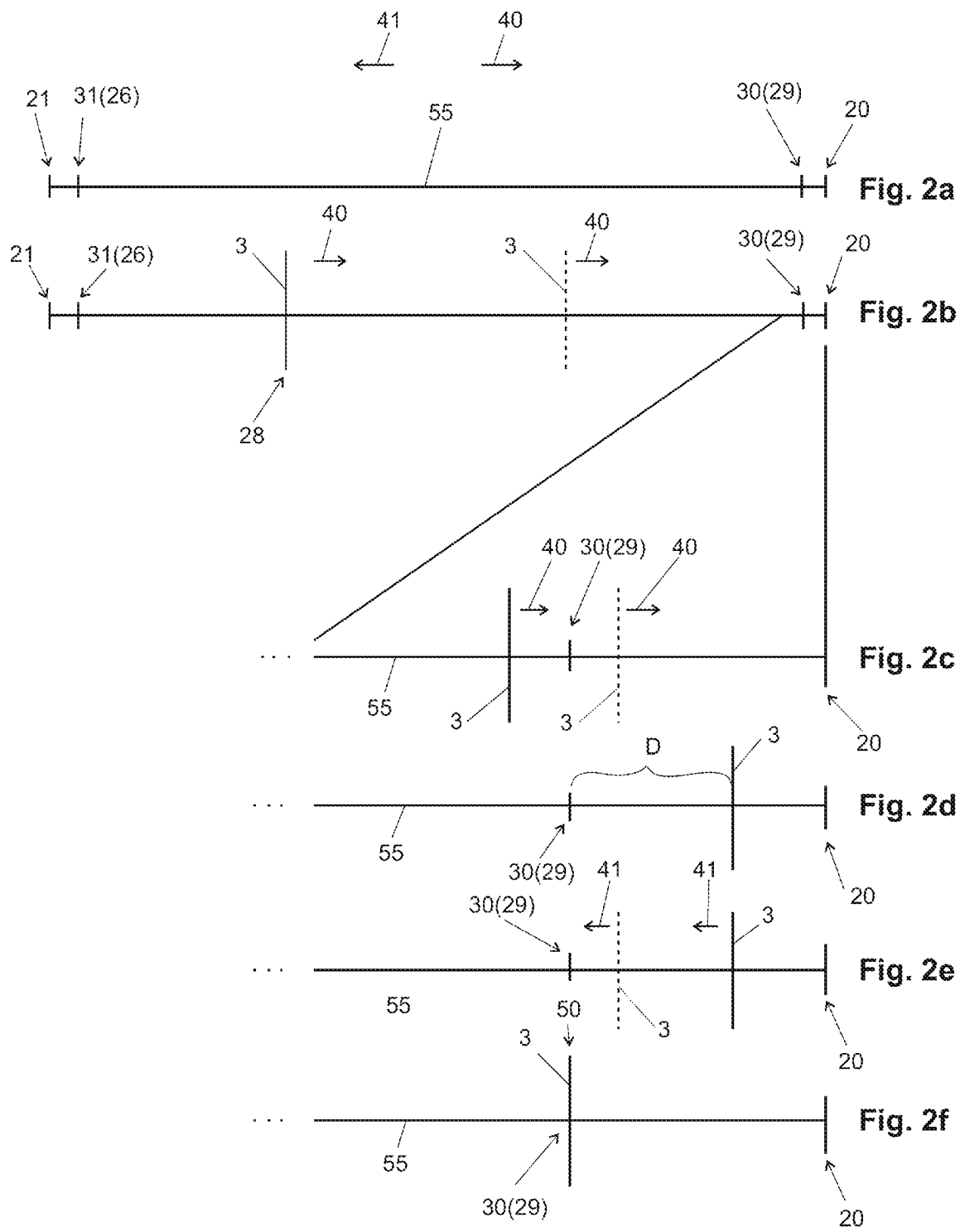

METHOD AND ELECTRICALLY ADJUSTABLE STEERING COLUMN FOR ADJUSTING A POSITIONING UNIT OF A STEERING COLUMN

CROSS REFERENCE TO RELATED APPLICATIONS

This application is a U.S. National Stage Entry of International Patent Application Serial Number PCT/EP2022/055021, filed Feb. 28, 2022, which claims priority to German Patent Application No. DE 10 2021 202 481.5, filed Mar. 15, 2021, the entire contents of which are incorporated herein by reference.

FIELD

The present disclosure generally relates to a method for adjusting a positioning unit of an electrically adjustable steering column for a motor vehicle.

BACKGROUND

Furthermore, the disclosure relates to an electrically adjustable steering column for a motor vehicle, which steering column comprises a supporting unit, by which a positioning unit is adjustably held, an adjustment device with an adjustment motor, said adjustment device being designed for adjusting the positioning unit relative to the supporting unit, a mechanical adjustment stop which mechanically limits an adjustment of the positioning unit in an adjustment direction, and a control unit. The control unit of the steering column is designed to activate the adjustment motor. A virtual adjustment stop is defined here, said adjustment stop being located upstream of the mechanical adjustment stop with respect to the first adjustment direction.

Electrically adjustable steering columns are known in the prior art. For example, US 2018/0079441 A1 discloses a steering column which is adjustable between a stowage position and an operating position. Furthermore, DE 10 2019 108 466 A1 discloses an adjustable steering column with a positioning unit and a supporting unit for a motor vehicle, wherein the steering column can be brought into a stowage position. The position of a positioning unit relative to the supporting unit is determined by means of a position recognition device, wherein the positioning unit is adjusted taking into consideration the position determined.

For a steering wheel arrangement with an electrically adjustable steering wheel, it is furthermore known from EP 3 042 825 A1 to recognize a vehicle state in which the vehicle is not moving, wherein, in such a vehicle state, the steering wheel can be automatically retracted. In particular, an increase in comfort for the driver of a vehicle is associated with said adjustment possibilities. In particular, electrically adjustable steering columns with what is referred to as an "Easy-Entry Function" are known, in which the positioning unit of a steering column is adjusted from an operator control position into a stowage position for easier entry into a car or easier exit from a car. Mechanical adjustment stops customarily mechanically limit the adjustment paths of the positioning unit here. That is to say, an adjustment of the positioning unit beyond a mechanical adjustment stop is not possible.

Since, however, components of the adjustment device, for example the adjustment motor, may be damaged if the positioning unit is repeatedly adjusted at a normal adjustment speed against the mechanical adjustment stop, and in particular if the positioning unit remains at the mechanical adjustment stop, it is known to define virtual adjustment stops at which the positioning unit generally reaches an end position before the mechanical adjustment stop is reached. Said virtual adjustment stops are defined here in such a manner that they are located close to the mechanical adjustment stops. Since, however, when the position of the positioning unit is determined, deviations may occur, in particular in the event of cost-effective methods for ascertaining the position of the positioning unit by counting the rotor rotations of the adjustment motor by means of a Hall sensor, the distance between the mechanical adjustment stop and virtual adjustment stop is selected to be greater in order to reliably prevent the positioning unit not being adjusted against the mechanical adjustment stop even in the event of deviations in the ascertaining of the position. Said greater distance between the mechanical adjustment stop and virtual adjustment stop is, however, disadvantageous insofar as part of the adjustment path, namely between the virtual adjustment stop and mechanical adjustment stop, cannot be used. This has the result that, for example, a steering wheel which has been brought into a stowage position is not as far away from the driver as an optimally defined virtual adjustment stop would permit.

Thus a need exists for an improved electrically adjustable steering column and a method for adjusting a positioning unit of an electrically adjustable steering column. In particular, the intention is to make maximum use of the available adjustment path. Furthermore, the intention is in particular to reliably prevent damage from occurring to components of the adjustment device of the steering column. Furthermore, the intention is to advantageously find a solution which is as cost-effective as possible.

BRIEF DESCRIPTION OF THE FIGURES

So that those skilled in the art to which the subject invention appertains will readily understand how to make and use the devices and methods of the subject invention without undue experimentation, preferred embodiments thereof will be described in detail herein below with reference to certain figures, wherein:

FIGS. 2*a* to 2*f* show an illustration of an embodiment of an adjustment of a positioning unit of a steering column or of a steering handle arranged on the positioning unit in accordance with the disclosure.

DETAILED DESCRIPTION

Figure 1A:
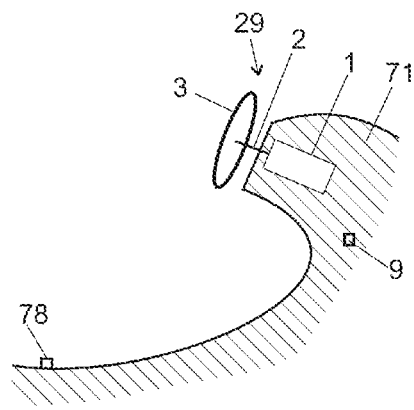
FIG. 1 shows a schematic of an embodiment of an installed steering column according to the disclosure with a steering handle in a stowage position (FIG. 1*a*) and in an operator control position (FIG. 1*b*).

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The disclosure relates to a method for adjusting a positioning unit of an electrically adjustable steering column for a motor vehicle, wherein the steering column comprises a supporting unit, by which the positioning unit is adjustably held, an adjustment device with an adjustment motor, said adjustment device being designed for adjusting the positioning unit relative to the supporting unit, and a mechanical adjustment stop, which mechanically limits an adjustment of the positioning unit in a first adjustment direction. For the positioning unit, a virtual adjustment stop is defined here, said adjustment stop lying upstream of the mechanical adjustment stop with respect to the first adjustment direction. The positioning unit is adjusted in the direction of the mechanical adjustment stop by means of the adjustment motor in the first adjustment direction at a first adjustment speed.

The proposed solution provides a method for adjusting a positioning unit of an electrically adjustable steering column for a motor vehicle, wherein the steering column comprises a supporting unit, by which the positioning unit is adjustably held, an adjustment device with an adjustment motor, said adjustment device being designed for adjusting the positioning unit relative to the supporting unit, and a mechanical adjustment stop, which mechanically limits an adjustment of the positioning unit in a first adjustment direction. A virtual adjustment stop for the positioning unit is defined here, said adjustment stop being located upstream of the mechanical adjustment stop with respect to the first adjustment direction. In particular, the virtual adjustment stop is the inoperative position, in which the positioning unit remains at the end of an adjustment path, in particular the stowage position. In particular, provision is made that the virtual adjustment stop is not defined as an absolute position with respect to the adjustment path, but rather advantageously in relative terms, in particular relative to a position of the positioning unit.

In the method proposed, the positioning unit is adjusted in the first adjustment direction by means of the adjustment motor at a first adjustment speed, wherein the positioning unit is adjusted in accordance with a defined first stipulation beyond the virtual adjustment stop. The positioning unit is then stopped for a reversal of the direction, and the positioning unit is adjusted in accordance with a defined second stipulation counter to the first adjustment direction as far as a holding position. The positioning unit is then stopped at the holding position. Said holding position can then be in particular the stowage position. In particular, provision is made that the defined first stipulation predefines how far the positioning unit is adjusted beyond the virtual adjustment stop, i.e. in particular when the positioning unit is stopped for the reversal of the direction. The defined second stipulation predefines in particular how far the positioning unit is adjusted counter to the first adjustment direction, i.e. in particular when the positioning unit is stopped to take up the holding position. In particular, a refinement makes provision that the defined first stipulation and the defined second stipulation are identical, and in particular define an identical distance, for example a distance of between 1 mm and 20 mm (mm: millimeters) about which the positioning unit is to be adjusted.

Advantageously, by means of the reversal of the direction and the defined adjustment of the positioning unit counter to the first adjustment direction, it is prevented that the positioning unit remains at the mechanical adjustment stop. Damage, in particular damage to the drive unit of the adjustment device, which may arise by a positioning unit remaining at the mechanical adjustment stop, is therefore advantageously prevented.

In particular, provision is made that the steering column is assigned a control unit, wherein advantageously the control unit activates the adjustment motor in such a manner that the adjustment unit is adjusted in the first adjustment direction at a first adjustment speed, the positioning unit is adjusted in accordance with the defined first stipulation to beyond the virtual adjustment stop, the positioning unit is stopped for a reversal of the direction, the positioning unit is adjusted in accordance with the defined second stipulation counter to the adjustment direction as far as the holding position, and the positioning unit is stopped at the holding position. Advantageously, the position of the positioning unit is detected, in particular by means of a position detection unit.

In particular, provision is made that the positioning unit is adjusted by means of a spindle drive, in particular as described in DE 10 2017 207 561 or in DE 10 2020 202 196, to the contents of which reference is hereby explicitly made.

An advantageous refinement of the disclosure makes provision that the adjustment of the positioning unit in accordance with the defined first stipulation is broken off when the positioning unit reaches the mechanical adjustment stop during the adjustment in accordance with the defined first stipulation. That is to say that in particular whenever the mechanical adjustment stop is reached by the positioning unit before the defined first stipulation is met, i.e., for example, the adjustment of the positioning unit by a predefined distance in the first adjustment direction, the adjustment of the positioning unit is broken off. The effect advantageously achieved by this is that the adjustment motor is not activated further in order to further adjust the positioning device in the first adjustment direction although the further adjustment path is blocked by the mechanical adjustment stop. This advantageously prevents damage to the components of the adjustment device, in particular to the adjustment motor. The situation in which the positioning unit reaches the mechanical adjustment stop before the defined first stipulation is met may occur here in particular if deviations or errors in the ascertaining of the position of the positioning unit occur. In particular whenever rotor rotations of the adjustment motor are detected by means of a Hall sensor, in order to ascertain the position of the positioning unit via the number of rotor rotations, errors may occur, in particular because rotor rotations are sometimes not counted because of the hysteresis behavior of Hall effect latch sensors.

According to a further particularly advantageous development of the disclosure, the holding position which the positioning unit takes up after the adjustment in accordance with the defined second stipulation is defined as a new virtual adjustment stop. Said new virtual adjustment stop is then advantageously defined as the virtual adjustment stop for the positioning unit. The new virtual adjustment stop therefore replaces the previous virtual adjustment stop. The virtual adjustment stop is therefore advantageously calibrated. In particular, provision is made that the holding position which the positioning unit takes up after the adjustment in accordance with the defined second stipulation is defined as a new virtual adjustment stop when the adjustment of the positioning unit in accordance with the defined first stipulation is broken off because the positioning unit has reached the mechanical adjustment stop during the adjustment in accordance with the defined first stipulation. In particular if the defined first stipulation and the defined second stipulation are identical and relate to an adjustment distance, the effect advantageously achieved by this is that the distance between the newly defined virtual adjustment stop and the mechanical adjustment stop is increased in relation to the distance between the previous virtual adjustment stop, which may have been displaced in particular due to errors in the ascertaining of the position of the positioning unit over time, and the mechanical adjustment stop. The effect advantageously achieved by this is that, upon a subsequent adjustment of the positioning unit in the first adjustment direction, the defined first stipulation can be met and the positioning unit is adjusted at maximum as far as the mechanical adjustment stop, but not against the mechanical adjustment stop before the direction is reversed. The components of the adjustment device are thereby advantageously further protected, and therefore the risk of failure of said components is reduced further.

According to a further advantageous refinement of the disclosure, the first adjustment speed is reduced to a second adjustment speed. Advantageously, the first adjustment speed is reduced to a second adjustment speed when a defined approach recognition condition has been recognized as being met. The positioning unit is then advantageously adjusted beyond the virtual adjustment stop at the second adjustment speed in accordance with the defined first stipulation. In the event that the positioning unit is moved against the mechanical adjustment stop, this advantageously takes place at a lower speed, as a result of which damage to the components of the adjustment device is even better prevented. Furthermore, the acoustic behavior of the steering column as it approaches an end position of the adjustment path, in particular as it approaches the stowage position, is advantageously improved. Advantageously, the positioning unit is therefore adjusted at a higher speed which permits a rapid adjustment of the positioning unit and therefore of a steering handle arranged on the positioning unit until the approach recognition condition is met, in which case the speed is then reduced, advantageously is continuously reduced. The adjustment speed is advantageously reduced in such a manner that the positioning unit comes to a stop by means of the continuous speed reduction when the defined first stipulation is met. The approach recognition condition is met in particular whenever the positioning unit has reached the virtual adjustment stop or a preascertained distance remains as far as the virtual adjustment stop. The approach recognition condition is therefore recognized as being met in particular when the positioning unit has reached a defined distance from the virtual adjustment stop. Alternatively, the approach recognition condition is recognized in particular as being met when the positioning unit has reached a defined distance from the mechanical adjustment stop. In particular, a speed between 10 mm/s (s: seconds) and 100 mm/s, in particular a speed of 70 mm/s, can be provided as the first adjustment speed. In particular, a speed between 1 mm/s and 20 mm/s can be provided as the second adjustment speed.

In particular, provision is made in the proposed method that a rotation of a rotor of the adjustment motor by a defined revolution portion during the adjustment of the positioning unit is in each case detected as a rotational movement of the rotor. For this purpose, a corresponding sensor unit, in particular at least one Hall sensor, is advantageously provided. A detected revolution portion is ascertained here in particular by the number of poles of the rotor magnet. For example, in the case of a two-pole rotor magnet, a revolution portion would correspond to one full revolution about 360°. In particular, provision is made that the number of detected revolution portions from a position of the positioning unit is counted in order to determine the position of the positioning unit. Advantageously, the counter is reset at the end positions of the adjustment path of the positioning unit, in particular at the mechanical adjustment stop and/or at the virtual adjustment stop.

According to an advantageous development of this refinement, the defined first stipulation is that, after the virtual adjustment stop is reached, the positioning unit is adjusted further for a predefined number of rotational movements of the rotor, i.e. beyond the virtual adjustment stop. In particular, provision is made that, for a number of two to twelve rotational movements of the rotor, particularly advantageously for three rotational movements of the rotor, furthermore in particular for a number of three Hall ticks, the positioning unit is adjusted beyond the virtual adjustment stop. Advantageously, the distance between the virtual adjustment stop and the mechanical adjustment stop corresponds here at least to the predefined number of rotational movements of the rotor. The distance between the virtual adjustment stop and the mechanical adjustment stop is preferably greater than the predefined number of rotational movements of the rotor, in particular greater than at least one rotational movement of the rotor.

According to a further advantageous development, the defined second stipulation is that, after the positioning unit is stopped for the reversal of the direction, the positioning unit is adjusted further for a predefined number of rotational movements of the rotor. In particular, provision is made that, for a number of three to twelve rotational movements of the rotor, particularly advantageously for five rotational movements of the rotor, furthermore in particular for a number of five Hall ticks, the positioning unit is adjusted counter to the first adjustment direction after the positioning unit is stopped for the reversal of the direction. In particular, provision can be made that the positioning unit is adjusted in accordance with the defined second stipulation for a predefined first number of rotational movements of the rotor. In particular, provision can furthermore be made that the positioning unit is adjusted in accordance with the first defined stipulation for a predefined second number of rotational movements of the rotor. The first number of rotational movements of the rotor is preferably equal to the second number of rotational movements of the rotor.

An advantageous refinement makes provision that the distance between the virtual adjustment stop and the mechanical adjustment stop is five rotational movements of the rotor. Advantageously, the defined first stipulation makes provision here that the positioning unit is adjusted by three rotational movements of the rotor beyond the virtual adjustment stop and is then stopped for the reversal of the direction. Furthermore, the positioning unit is then advantageously adjusted in accordance with the defined second stipulation in the opposite direction by three rotational movements of the rotor and stopped at the holding position which has then been reached.

According to a further advantageous embodiment of the disclosure, the defined first stipulation is that the positioning unit is adjusted as far as the mechanical adjustment stop. In the case of this refinement, the positioning unit is advantageously moved in a targeted manner as far as the mechanical adjustment stop, preferably at a speed reduced in comparison to the first adjustment speed. By this means, advantageously, reliable calibration of the distance between the virtual adjustment stop and the mechanical adjustment stop is made possible. In particular, it is thus prevented that the virtual adjustment stop "migrates away" from the mechanical adjustment stop and the adjustment path for the positioning unit is thus shortened over a long period of use due to errors in the ascertaining of the position of the positioning unit.

A further advantageous refinement of the disclosure makes provision that loading of the adjustment motor, in particular a motor voltage and/or a motor torque, during the adjustment of the positioning unit is detected and evaluated. When a predefined threshold value for the loading of the adjustment motor is exceeded, in particular when a predefined motor voltage or a predefined motor torque is exceeded, it is advantageously recognized that the positioning unit has reached the mechanical adjustment stop. It can therefore be simply and cost-effectively recognized that the positioning unit has been adjusted against a mechanical adjustment stop of the steering column. Sensors on the mechanical adjustment stop or on the mechanical adjustment stops are therefore advantageously unnecessary.

A further advantageous embodiment of the disclosure makes provision that the method for adjusting the positioning unit is carried out a number m of times with the defined first stipulation that, after the virtual adjustment stop is reached, the positioning unit is adjusted further for the predefined second number of rotational movements of the rotor and each m+1th time with the defined first stipulation that the positioning unit is adjusted as far as the mechanical adjustment stop. This has the advantage that for each m+1th time the virtual adjustment stop is calibrated with respect to the mechanical adjustment stop and, in addition, an adjustment of the positioning unit against the mechanical adjustment stop is generally prevented. In this case, "m" is advantageously a positive whole natural number. In particular, provision can be made that the number m lies between two and 1000. In particular, m can lie between 20 and 200. As a particular refinement, provision can be made in particular that, in particular for a predefined operating period, m=0 or m=1, and therefore, when m=0, the positioning unit is always adjusted as far as the mechanical adjustment stop, and, when m=1, the positioning unit is always further adjusted alternately, after the virtual adjustment stop is reached, for the predefined second number of rotational movements of the rotor and/or is adjusted as far as the mechanical adjustment stop.

The electrically adjustable steering column for a motor vehicle includes a supporting unit, by which a positioning unit is adjustably held, and an adjustment device with an adjustment motor which is designed for adjusting the positioning unit relative to the supporting unit, in particular as described in DE 10 2017 207 561 or in DE 10 2020 202 196, to the contents of which reference is hereby explicitly made. Furthermore, the steering column comprises a mechanical adjustment stop which mechanically limits an adjustment of the positioning unit in a first adjustment direction. In addition to the mechanical adjustment stop, a virtual adjustment stop is defined. Said virtual adjustment stop is located upstream of the mechanical adjustment stop with respect to the first adjustment direction. In particular, the virtual adjustment stop is provided as a holding position for the positioning unit, in which holding position the positioning unit remains at the end of an adjustment process proceeding as far as an end of an adjustment path. In this respect, the virtual adjustment stop can correspond in particular to the stowage position of the positioning unit. In particular, for an adjustment path, the steering column can in each case have a first mechanical adjustment stop, which is located at a first end of the adjustment path, and a second mechanical adjustment stop, which is located at a second end of the adjustment path. Advantageously, a virtual adjustment stop is also defined here for each mechanical adjustment stop. Advantageously, however, the disclosure makes it possible to save on a mechanical adjustment stop, in particular because a specific approach to a mechanical adjustment stop results in a calibration, and therefore a second virtual adjustment stop, to which no mechanical adjustment stop is assigned, can be reliably approached by the positioning unit.

In particular, the proposed steering column is designed for adjusting the positioning unit in accordance with a method proposed for achieving the above-mentioned object, wherein the method can have the above-described features individually or in combination. In particular, provision is made that the proposed steering column comprises a control unit, wherein the control unit is advantageously designed to activate the adjustment motor of the adjustment device of the steering column in such a manner that the positioning unit can be adjusted in accordance with the method steps described. In particular, the control unit is designed to activate the adjustment motor in such a manner that the positioning unit is adjusted in the first adjustment direction by means of the adjustment motor at a first adjustment speed, the positioning unit is adjusted in accordance with a defined first stipulation to beyond the virtual adjustment stop, the positioning unit is stopped for a reversal of the direction, the positioning unit is adjusted in accordance with a defined second stipulation counter to the first adjustment direction as far as a holding position, and the positioning unit is then stopped at the holding position.

Advantageously, by means of the reversal of the direction and the defined adjustment of the positioning unit counter to the first adjustment direction, it is prevented that the positioning unit remains at the mechanical adjustment stop. Damage, in particular damage to the drive unit of the adjustment device, which may arise by the positioning unit remaining at the mechanical adjustment stop, is therefore advantageously prevented.

Furthermore, it is advantageously provided that the proposed steering column comprises a position detection unit. The position detection unit is advantageously designed to detect the position of the positioning unit relative to the supporting unit. In this case, the position detection unit is advantageously connected to the control unit in terms of communication. The control unit can therefore advantageously obtain information regarding the position of the positioning unit from the position detection unit and can use same in particular for activating the adjustment motor in order to carry out a method proposed according to the disclosure. In particular, the position detection unit can comprise a linear sensor for determining the position. Advantageously, a reference point for safety aspects can be approached, in particular using the position detection unit.

Advantageously, the steering column, in particular the position detection unit of the steering column, has a sensor unit, in particular at least one Hall sensor. The sensor unit is advantageously designed to detect a rotation of a rotor of the adjustment motor by a defined revolution portion during the adjustment of the positioning unit in each case as a rotational movement of the rotor. A rotational movement of the rotor advantageously corresponds here to a Hall count or a Hall tick, i.e. in particular a response of the Hall sensor. In particular, in the case of a magnetically two-pole rotor, a rotational movement of the rotor is a full revolution of the rotor, i.e. a revolution about 360°, and is counted in particular as a Hall count or a Hall tick. The sensor unit is advantageously connected to the control unit in terms of communication such that the control unit can advantageously take the rotational movements of the rotor into consideration when activating the adjustment motor.

Advantageously, the steering column, in particular the position detection unit of the steering column, comprises a counter which is designed to count the number of rotational movements of the rotor, wherein the counter is advantageously connected to the control unit in terms of communication. In particular, provision is made that the position detection unit ascertains the position of the positioning unit via the number of rotational movements of the rotor. Provision is made here in particular that an adjustment path of the steering column, in particular an adjustment path limited by a first mechanical stop and a second mechanical stop, is assigned a fixed number of rotational movements of the rotor, advantageously the number of rotational movements of the rotor which are necessary in order to adjust the positioning unit from the one end of the adjustment path to the other end of the adjustment path. In this way, a favorable determination of the position is advantageously realized. Possible errors which may arise here in particular by the fact that the state of the Hall sensor changes from "high" to "low" between the adjustment motor being switched off and switched on again, are not critical here because of the advantageous activation of the adjustment motor, as already described, since calibration automatically takes place again. A plurality of Hall sensors can be provided for the further reduction.

Furthermore advantageously, the steering column has a motor loading detection unit. The latter is advantageously designed to detect loading of the adjustment motor during the adjustment of the positioning unit, in particular a motor voltage and/or a motor torque. Advantageously, the motor loading detection unit is furthermore designed to evaluate the loading of the adjustment motor during the adjustment of the positioning unit for an exceeding of a predefined threshold value for the loading of the adjustment motor and in particular to recognize an exceeding of a predefined threshold value for the loading of the adjustment motor. In particular, the motor loading detection unit is connected here to the control unit in terms of communication such that the control unit can advantageously take motor loading into consideration in the activation of the adjustment motor.

In the various figures, identical parts are generally provided with the same reference signs and are therefore sometimes also in each case explained only in conjunction with one of the figures.

Figure 1B:
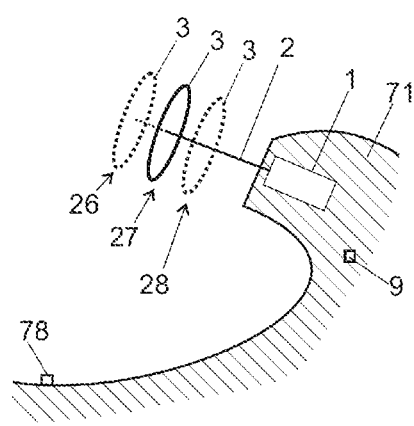

FIG. 1a and FIG. 1b show sketches of an exemplary embodiment of an electrically adjustable steering column 1 installed in a part 71 of a motor vehicle. The steering column 1 here comprises a positioning unit 2 which can be adjusted in relation to a supporting unit of the steering column 1. In this exemplary embodiment, the positioning unit 2 comprises that part of a steering shaft, at the end of which a steering handle 3 is arranged. The steering column 1 furthermore comprises a control unit 9 which is designed to activate an adjustment motor, not explicitly illustrated in FIG. 1a and FIG. 1b, in order to be able to adjust the positioning unit 2 in relation to the supporting unit. The positioning unit 2 and therefore the steering handle 3 can be adjusted here in particular in such a manner that, as shown in FIG. 1a, a stowage position 29 or, as shown in FIG. 1b, an operator control position 26, 27, 28 is taken up.

The stowage position 29 here is a position which can be taken up in this exemplary embodiment when a driver wants to enter the motor vehicle or exit from the motor vehicle. Furthermore, the stowage position 29 is taken up in this exemplary embodiment if the motor vehicle is in an autonomous driving mode, in which the motor vehicle is steered without intervention by a driver.

By contrast, the operator control position 26, 27, 28 is a position which is taken up in this exemplary embodiment when a driver steers the motor vehicle, i.e. when the motor vehicle is in a manual driving mode. Different operator control positions 26, 27, 28 are possible here, in particular also further ones than those shown in FIG. 1b. The operator control position 26, 27, 28 is preferably individually predefined here for each driver or is preset by a driver before using the motor vehicle for the first time, with it being possible for the actual operator control position 26, 27, 28 to be set in particular depending on the driver's height and on the driver's personal preferences.

In the exemplary embodiment illustrated in FIG. 1a and FIG. 1b, the stowage position 29 and the operator control position 26 illustrated are in each case here end positions along the possible adjustment path, in which the positioning unit 2 or the steering handle 3 can remain.

FIG. 1a and FIG. 1b also illustrate by way of example a switching element 78, the actuation of which enables a driver to switch between an autonomous driving mode and a manual driving mode, which then generally also has the result of adjusting the steering handle 3.

It is assumed by way of example here that a driver has switched from a manual operating mode of the motor vehicle into an autonomous operating mode by actuating the switching element 78. This has the result that the steering handle 3 is brought from an operator control position 26, 27, 28 along an adjustment path into the stowage position 29.

An adjustment of the positioning unit 2 and therefore also of the steering handle 3 along the adjustment path will be explained here in more detail below with reference to FIG. 2a to FIG. 2f, wherein FIG. 2a to FIG. 2f are merely greatly simplified illustrations. In particular, FIG. 2b to FIG. 2f illustrate the steering handle 3 and not explicitly the positioning unit of the steering column, and therefore reference is made below to the steering handle 3 instead of the positioning unit.

In the case of the exemplary embodiment shown in FIG. 2a to FIG. 2f, the adjustment path 55 is limited at each of its ends by a mechanical adjustment stop 20, 21. A first mechanical adjustment stop 20 mechanically limits here an adjustment of the positioning unit and therefore of the steering handle 3 in a first adjustment direction 40. A second mechanical adjustment stop 21 mechanically limits an adjustment of the positioning unit and therefore of the steering handle 3 in a second adjustment direction 41 which is directed counter to the first adjustment direction 40. The adjustment directions 40, 41 are symbolized by corresponding arrows in FIG. 2a to FIG. 2f. For the positioning unit, in each case a first virtual adjustment stop 30, which is located upstream of the mechanical adjustment stop 20 with respect to the first adjustment direction 40, and a second virtual adjustment stop 31, which is located upstream of the mechanical adjustment stop 20 with respect to the second adjustment stop 41, are defined. The positioning unit can be adjusted here in each case beyond the first virtual adjustment stop 30 in the direction of the first mechanical adjustment stop 20 and beyond the second virtual adjustment stop 31 in the direction of the second mechanical adjustment stop 21. However, provision is made that the positioning unit, and therefore the steering handle 3 in FIG. 2b to FIG. 2f, can remain permanently only in the virtual adjustment stops 30, 31 as respectively outermost point of the adjustment path 55. Thus, in this exemplary embodiment, the first virtual adjustment stop 30 for the positioning unit corresponds to the stowage position 29 for the steering handle 3 and the second virtual adjustment stop 31 for the positioning unit corresponds to the outermost operator control position 26 for the steering handle 3.

It is now assumed for FIG. 2b that the steering handle 3 is intended to be brought from the operator control position 28 into the stowage position 29. In order to achieve this, the positioning unit is therefore adjusted in the first adjustment direction 40 by means of an adjustment device at a first adjustment speed. The steering handle 3, illustrated by dashed lines, symbolizes the adjustment progress here. For better illustration, a detail of the adjustment path 55 about the first virtual adjustment stop 30 is moreover illustrated in enlarged form in FIG. 2c to FIG. 2f.

The positioning unit or the steering handle 3 is then adjusted in accordance with a defined first stipulation which, in this exemplary embodiment, predefines a distance D, to beyond the first virtual adjustment stop 30, as shown in FIG. 2c. If the distance D is reached after the first virtual adjustment stop 30, the positioning unit or the steering handle 3 is stopped for a reversal of the direction, as shown in FIG. 2d. The positioning unit or the steering handle 3 is then adjusted in accordance with a defined second stipulation, which, in this exemplary embodiment, likewise predefines the distance D, counter to the first adjustment direction 40, i.e. in the second adjustment direction 41, as shown in FIG. 2e. The positioning unit or the steering handle 3 is adjusted until the holding position 50 resulting from the distance D is reached. The positioning unit or the steering handle 3 is then stopped at the holding position 50, as shown in FIG. 2f, and remains there as the end position. In this exemplary embodiment, the holding position 50 here coincides with the first virtual adjustment stop 30 and therefore with the stowage position 29. In particular, however, the case which is not shown here may occur that, in particular due to an erroneous ascertaining of the position of the positioning unit, the holding position 50 does not coincide with the first virtual adjustment stop 30. In this case, provision is made in particular that the holding position which is then reached is newly defined as a then applicable first virtual adjustment stop.

Figures 3A, 3B:
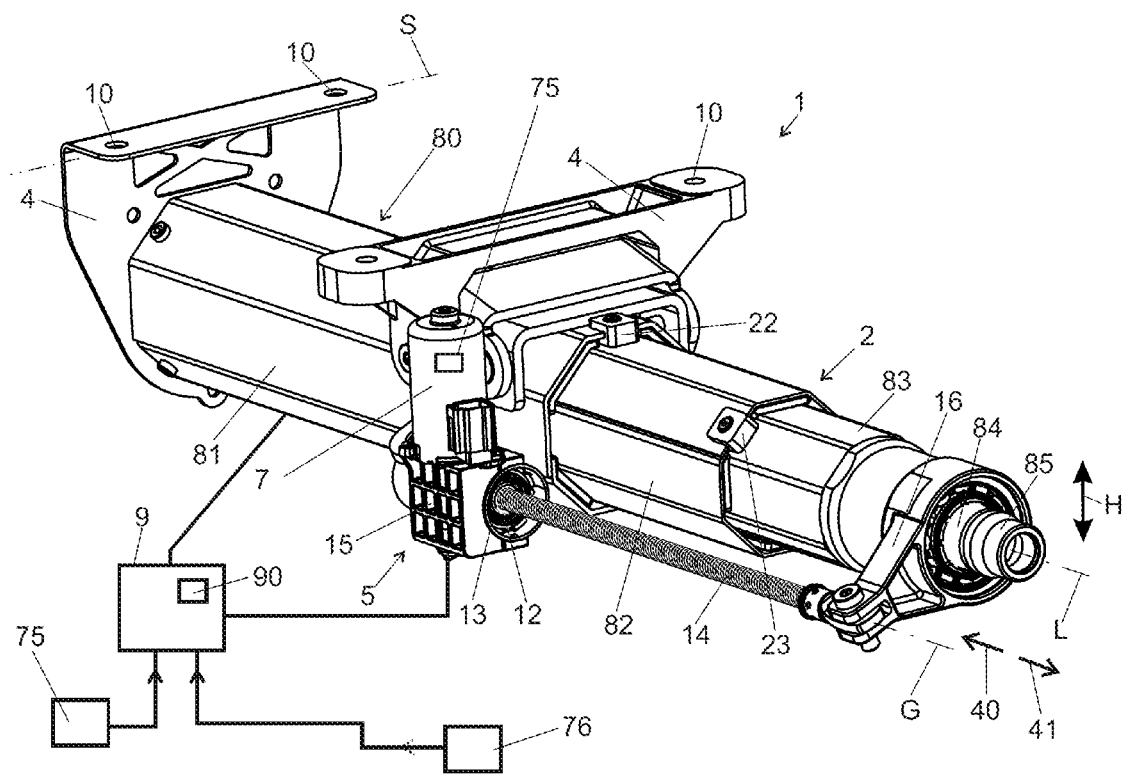
FIGS. 3*a* and 3*b* shows an embodiment of a steering column according to the disclosure in a perspective illustration.

FIG. 3a and FIG. 3b illustrate an exemplary embodiment of a steering column 1 designed according to the disclosure for a motor vehicle from different perspectives. The steering column 1 is electrically adjustable. In this exemplary embodiment, the steering column 1 comprises a supporting unit 4 which is of multi-part design and has fastening means 10 for attaching the supporting unit 4 to a vehicle body, not illustrated. Furthermore, the steering column 1 comprises a positioning unit 2 which is held adjustably by the supporting unit 4. In this exemplary embodiment, height-adjustability, symbolized by the double arrow H in FIG. 3a and FIG. 3b, and adjustability in the direction of the longitudinal axis L in a first adjustment direction 40 and a second adjustment direction 41, in each case symbolized by an arrow, are made possible here. Both for the height adjustment and for the adjustment in the direction of the longitudinal axis L, use is advantageously made here of a method proposed according to the disclosure for adjusting the positioning unit 2.

In order to adjust the positioning unit 2 in the first adjustment direction 40 and the second adjustment direction 41, the steering column 1 comprises a first adjustment device 5 with a first adjustment motor 7. For the height-adjustability, the steering column 1 comprises a second adjustment device 6 with a second adjustment motor 8.

The steering column 1 furthermore comprises a casing unit 80 which has an outer casing tube 81, an intermediate casing tube 82 and an inner casing tube 83. The casing tubes 81, 82 and 83 are arranged axially so as to be telescopically adjustable one inside another coaxially, in the axial direction of a longitudinal axis L, namely in the first adjustment direction 40 and in the second adjustment direction 41. In the casing unit 80, a steering spindle 84 is mounted rotatably about the longitudinal axis L and, at its rear end, has a connection portion 85 for attaching a steering handle, not illustrated in FIG. 3a and FIG. 3b. The steering spindle 84, like the casing unit 80, is likewise telescopic in the longitudinal direction.

In respect of the adjustability of the positioning unit 2 in the direction of the longitudinal axis L, the positioning unit 2 comprises the intermediate casing tube 82 and the inner casing tube 83 together with the steering spindle 84 mounted therein. The supporting unit 4 comprises the casing unit 80. To realize a longitudinal adjustment, the positioning unit 2 is accommodated in the outer casing tube 31 so as to be telescopically displaceable relative to the casing unit 3 in the direction of the longitudinal axis L in order to be able to position the steering handle, which is ultimately connected to the steering spindle 84, forward and backward in the longitudinal direction relative to the supporting unit 4, as indicated by the arrows 40, 41.

At the end facing forward, a mechanical adjustment stop 22 is attached to the outer casing tube 81, said adjustment stop protruding inward at the open end into the intermediate space between the outer casing tube 81 and intermediate casing tube 82. During the adjustment, the mechanical adjustment stop 22 mechanically limits an adjustment of the intermediate casing tube 82 in the first adjustment direction 40 and thus secures the intermediate casing tube 82 against separating from the outer casing tube 81. A further mechanical adjustment stop 23 protruding inward into the intermediate space between the intermediate casing tube 82 and inner casing tube 83 is attached to the forwardly facing end of the intermediate casing tube 82, said adjustment stop mechanically limiting an adjustment of the inner casing tube 83 and securing the inner casing tube 83 against being pulled out of the intermediate casing tube 82. A virtual adjustment stop is defined here in each case for the positioning unit 2 upstream of the mechanical adjustment stops 22, 23. The respective virtual adjustment stop is located here a preascertained number of rotational movements of the rotor upstream of the respective mechanical adjustment stop 22, 23, in particular in each case five rotational movements of the rotor upstream of the stop. In the specific example, this therefore means that the adjustment motor 7 can also be adjusted further from a virtual adjustment stop for five rotational movements of the rotor in the direction of the associated mechanical adjustment stop 22, 23 until the positioning unit reaches and touches the associated mechanical adjustment stop 22, 23.

In this exemplary embodiment, the casing unit 80 of the steering column 1 is mounted in its rear region so as to be pivotable relative to the vehicle body about a horizontal pivot axis S which lies transversely with respect to the longitudinal axis L and is illustrated schematically. For this purpose, a pivot bearing, not illustrated, is arranged in the supporting unit 4 or between said supporting unit 4 and the vehicle body. In the front region, the casing unit 80 is connected to the supporting unit 4 via a positioning lever 11.

By means of a rotational movement of the positioning lever 11 by means of the second adjustment device 6 of the steering column 1, as shown in FIG. 3b, the casing unit 80 can be adjusted, in particular pivoted, together with the positioning unit 2 relative to the supporting unit 4 about the pivot axis S lying horizontally in the installed state, as a result of which in particular an adjustment of a steering handle attached to the connection portion 85 can be undertaken in the vertical direction, which is indicated by the double arrow H.

The first adjustment device 5 of the steering column 1 is designed for the longitudinal adjustment of the positioning unit 2 relative to the casing unit 80 in the first adjustment direction 40 and the second adjustment direction 41. In this exemplary embodiment, the first adjustment device 5 has a spindle drive with a spindle nut 12 having an internal thread 13 which extends along a spindle axis G and in which a threaded spindle 14 engages, i.e. is screwed with its external thread into the corresponding internal thread 13 of the spindle nut 12. In this exemplary embodiment, the threaded spindle axis of the threaded spindle 14 is identical to the spindle axis G and runs substantially parallel to the longitudinal axis L.

The spindle nut 12 is mounted rotatably about the spindle axis G in a bearing housing 15 which is fixedly connected to the outer casing tube 81 of the casing unit 80. In the direction of the spindle axis G, the spindle nut 12 is supported axially on the casing unit 80 via the bearing housing 15. In this exemplary embodiment, the adjustment device 5 is correspondingly what is referred to as a plunger spindle drive.

The free end of the threaded spindle 14 is connected at an arm 16 to the inner casing tube 83 for conjoint rotation and in a manner fixedly supported axially, and the spindle nut 12 is supported via the bearing housing 15 and the first adjustment motor 7 axially, that is to say in the longitudinal direction, on the outer casing tube 81. The longitudinal direction corresponds to the direction of the longitudinal axis L. A relative rotation by means of the adjustment motor 7 of the adjustment device 5 causes the threaded spindle 14 and the spindle nut 12 to be moved together or apart, depending on the direction of rotation, as a result of which the inner casing tube 83 is retracted axially into the intermediate casing tube 82, and the latter into the outer casing tube 81 in the first adjustment direction 40, or is extended in the second adjustment direction 41. As a result, a steering handle attached to the connection portion 85 can be adjusted into a stowage position 29, as shown in the sketch in FIG. 1a, or into an operator control position 26, 27, 28, as shown in the sketch in FIG. 1b. In the stowage position 29, the inner casing tube 83 and the intermediate casing tube 82 are retracted into the outer casing tube 81. In the operator control position 26, 27, 28, the casing tubes 81, 82 and 83 are extended telescopically apart from one another.

It can be seen in FIG. 3b how the second adjustment device 6 is attached to the steering column 1 for adjustment in the vertical direction. Said second adjustment device 6 is constructed in principle in a manner acting identically to the first adjustment device 5. The second adjustment device 6 likewise comprises a spindle nut 17, in the internal thread of which a threaded spindle 18 engages along a spindle axis G. The threaded spindle 18 is mounted rotatably about the axis G in a bearing housing 19, which is fastened to the casing unit 80, and is supported axially, in the direction of the axis G, on the casing unit 80, and can be driven in rotation optionally in both directions of rotation about the axis G by a second adjustment motor 8.

In the illustrated embodiment, the adjustment devices 5, 6 of the steering column 1 are what are referred to as plunger spindle drives. Alternatively, it is also possible in particular to form a rotational spindle drive, in which the spindle nut 12 or 17 is held with respect to rotation on the steering column 1, and the threaded spindle 14 or 18 can be driven in rotation by the adjustment motor 7 or 8.

The second adjustment device 6 acts on that end of the two-armed positioning lever 11 which is mounted on the supporting unit 4 so as to be rotatable about a pivot bearing 72, and the other arm of said positioning lever is connected at the other end to the casing unit 80 in a further pivot bearing 73.

In this exemplary embodiment, the first adjustment motor 7 and the second adjustment motor 8 of the adjustment devices 5, 6 each comprise a Hall sensor 75, 76 which is merely illustrated schematically in FIG. 3a and FIG. 3b. A rotation of the rotor of the adjustment motor 7 about a defined revolution portion during the adjustment of the positioning unit 2 in the direction of the longitudinal axis L is in each case detected as a rotational movement of the rotor by means of the Hall sensor 75 of the first adjustment motor 7. In particular, provision is made that in each case one full revolution of the rotor is detected here. Correspondingly, a rotation of the rotor of the adjustment motor 8 by a defined revolution portion during a height adjustment H of the positioning unit 2 is in each case detected as a rotational movement of the rotor by means of the Hall sensor 76 of the second adjustment motor 8. In particular, provision is made that one full revolution of the rotor is in each case detected here.

The steering column 1 furthermore comprises a control unit 9 which is likewise merely illustrated schematically in FIG. 3a and FIG. 3b. The control unit 9 is designed here for activating the adjustment motors 7, 8. In this exemplary embodiment, provision is also made that the Hall sensors 75, 76 are connected to the control unit 9 in terms of communication, and the detected rotational movements of the rotor are supplied to the control unit 9. The control unit 9 here comprises a position detection unit 90 which is designed to ascertain the position of the positioning unit 2 relative to the supporting unit 4 from the rotational movements of the rotor that are detected by the Hall sensors 75, 76. The relationship between rotational movements of the rotor and revolutions of the respective threaded spindle 14, 18 and the resulting adjustment path of the positioning unit 2 are taken into consideration here.

Figure 4:
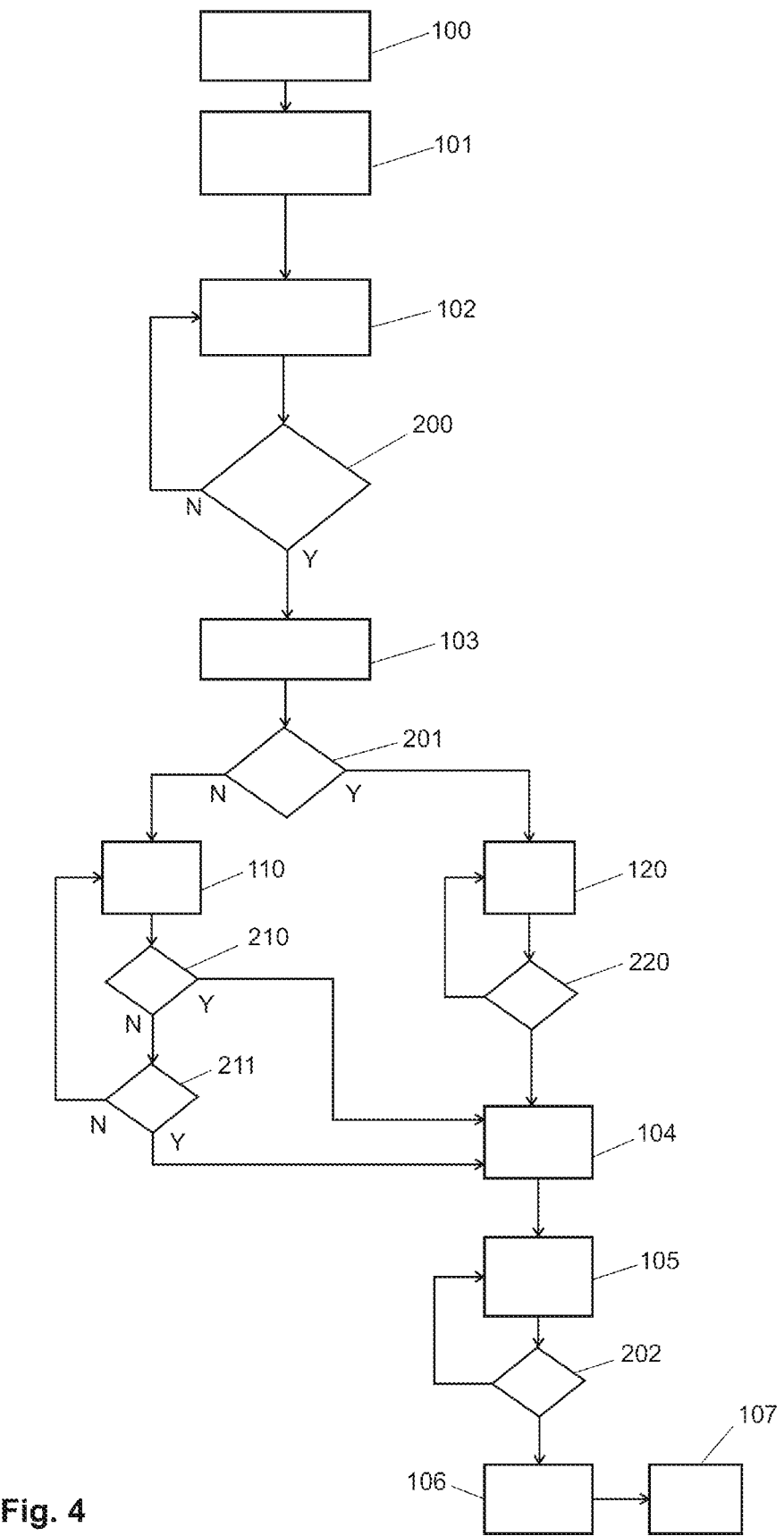
FIG. 4 shows an embodiment of a method according to the disclosure for adjusting a positioning unit of an electrically adjustable steering column in the form of a sequence diagram.

The control unit 9 of the steering column 1 is furthermore designed to activate the adjustment motors 7, 8 in such a manner that the positioning unit 2 is adjusted relative to the supporting unit 4, in particular in accordance with an adjustment stipulation. In particular, the control unit is designed to carry out a method, as explained below with reference to FIG. 4. FIG. 4 here shows a sequence diagram according to which an adjustment of a positioning unit of a steering column in relation to a supporting unit of the steering column can be carried out.

In the exemplary embodiment shown in FIG. 4, the control unit 9, in a method step 100, here receives the command to bring the positioning unit into the stowage position. In a step 101, it is detected here by a counter which particular adjustment process is started and, in a step 102, the positioning unit is adjusted in a first adjustment direction by means of the adjustment motor at a first adjustment speed. Provision is made here in particular, with respect to the steering column according to FIG. 3a and FIG. 3b, that the positioning unit 2 is adjusted in the first adjustment direction 40 in the direction of the longitudinal axis L. The first adjustment speed here can be in particular 60 mm/s. During the adjustment, it is checked here, in a further step 200, whether a defined approach recognition condition is met. The approach recognition condition is recognized here as being met if the positioning unit has reached a distance, which is defined via a predefined number of rotational movements of the rotor, from the virtual adjustment stop. In particular, provision is made that the approach recognition condition is recognized as being met if the positioning unit is twenty rotational movements of the rotor away from the virtual adjustment stop. If the approach recognition condition is not met (N), the positioning unit is adjusted further at the first adjustment speed. If the approach recognition condition is met (Y), in a step 103 the adjustment speed of the positioning unit is reduced to a second adjustment speed which is lower than the first adjustment speed, in particular to an adjustment speed of 5 mm/s.

Furthermore, it is checked in a step 201 whether the adjustment process is an m+1th adjustment process. This step can already be undertaken from the outset too. The reason for this is that, in this exemplary embodiment, provision is made that each m+1th adjustment process is in each case carried out in a departure from the preceding m adjustment processes. In particular, each eightieth adjustment process can be carried out in a departure from the preceding seventy-nine adjustment processes.

If the test reveals that this is not an m+1th adjustment process, in a step 110 the positioning unit is adjusted further in the first adjustment direction at the reduced second adjustment speed in accordance with a predefined number of rotational movements of the rotor after the virtual adjustment stop is reached, in particular with a number of four rotational movements of the rotor. In the process, it is firstly checked, in a step 210, whether the adjustment motor has carried out the predefined number of rotational movements of the rotor. If this is not the case (N), it is also checked in a further step 211 whether the positioning unit has already reached the mechanical adjustment stop. The reaching of the mechanical adjustment stop can be undertaken here in particular by monitoring the motor voltage which rises when the mechanical adjustment stop is reached.

If the mechanical adjustment stop should not yet have been reached (N) and the predefined number of rotational movements of the rotor not yet have been carried out (N), the positioning unit is adjusted further in the first adjustment direction at the reduced second adjustment speed. If, by contrast, the adjustment motor has carried out the predefined number of rotational movements of the rotor (Y) or the positioning unit has reached the mechanical adjustment stop (Y), the adjustment motor and therefore the positioning unit is stopped in a step 104 for a reversal of the direction. At an m+1th adjustment process, the positioning unit is consciously adjusted as far as the mechanical adjustment stop in order to calibrate the virtual adjustment stop. In a step 120, the positioning unit is therefore adjusted at the reduced second adjustment speed in the direction of the mechanical adjustment stop, i.e. in the first adjustment direction. It is checked here in a step 220 whether the positioning unit has reached the mechanical adjustment stop. If this is not the case (N), the positioning unit is adjusted further. When the mechanical adjustment stop is reached (Y), the positioning unit is likewise stopped in step 104 for a reversal of the direction of the positioning unit.

After the stopping in accordance with step 104, the positioning unit is adjusted, in a step 105, counter to the first adjustment direction, i.e. away from the mechanical adjustment stop, in accordance with a predefined number of rotational movements of the rotor. In particular, a number of four rotational movements of the rotor is likewise provided here as a stipulation. Furthermore, it is checked in a step 202 whether the adjustment motor has carried out the predefined number of rotational movements of the rotor. If no (N), the positioning unit is adjusted further. Otherwise (Y), the positioning unit is stopped in a step 106. The stowage position is reached and the positioning unit remains in said holding position until there is a further adjustment request.

Furthermore, in this exemplary embodiment, the holding position is defined in a step 107 as a new virtual adjustment stop. Said new defined virtual adjustment stop replaces the previous defined virtual adjustment stop here. The virtual adjustment stop is therefore continuously calibrated. In a refinement variant which is not illustrated in FIG. 4, provision is made that the new definition of the virtual adjustment stop also only takes place at every m+1th adjustment process in which the positioning unit is consciously adjusted as far as the mechanical adjustment stop.

Figure 5:
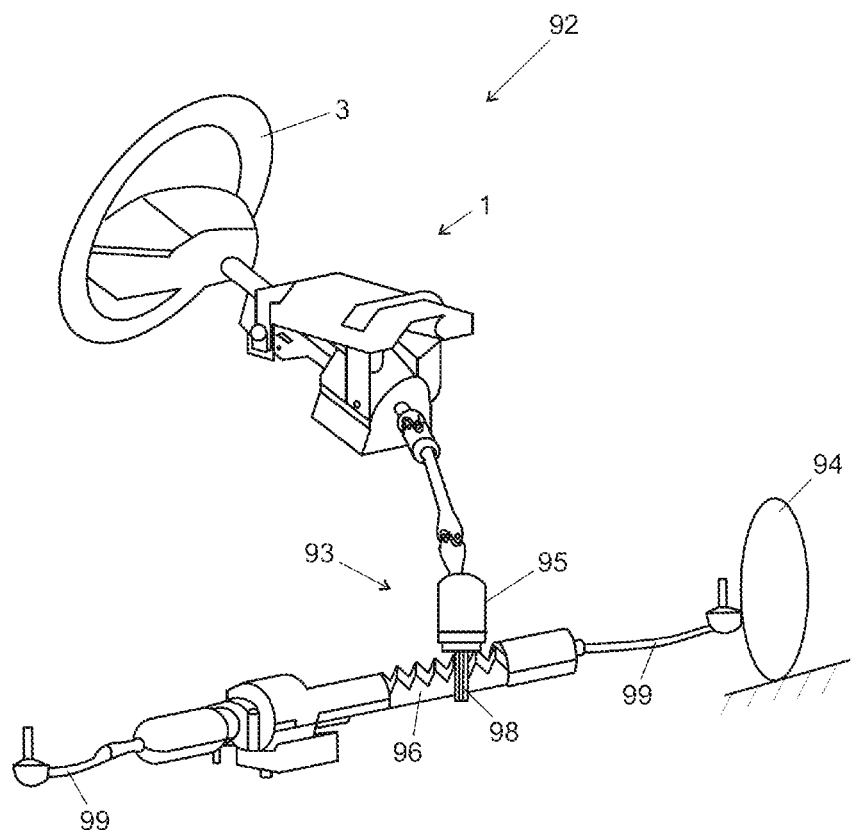
FIG. 5 shows a perspective view of a schematic of an embodiment of a steering system with a steering column according to the disclosure.

FIG. 5 shows an exemplary embodiment of an electromechanical steering system 92 of a motor vehicle with a steering column 1 which can be designed in particular as described with reference to FIG. 3a and FIG. 3b. As an alternative to the steering system 92 illustrated in FIG. 5, a steer-by-wire steering system can also be provided.

The steering system 92 illustrated in FIG. 5 comprises a steering column 1 with a steering shaft and a steering handle 3 which is connected to the steering shaft for conjoint rotation and is designed in this exemplary embodiment as a steering wheel. A driver can predefine a steering command in a known manner by rotation via the steering handle 3 here. The steering column 1 is mechanically coupled to the steered wheels 94 of the motor vehicle via a steering mechanism 93. The steering mechanism 93 comprises a pinion 98 which is controlled by a steering actuator 95, and a toothed coupling rod 96. The steering mechanism 93 serves here for translating a rotational movement of the pinion 98 into a translational movement of the coupling rod 96 along the longitudinal axis thereof. The coupling rod 96 which moves linearly along its longitudinal axis is in each case mechanically coupled to a track rod 99 on both sides of the motor vehicle. The track rods 99 are in turn in each case mechanically coupled to the vehicle wheels 94.

Figure 6A:
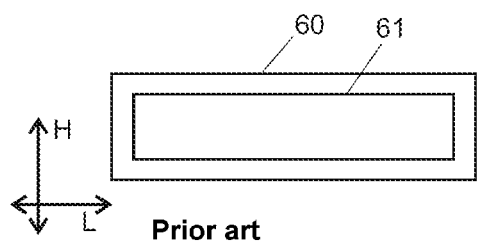
FIG. 6 shows a known schematic of an adjustment space for a positioning unit with a virtual adjustment space within said adjustment space, as defined at the beginning (FIG. 6*a*) and after a multiplicity of adjustment cycles (FIG. 6*b*).

FIG. 6a to FIG. 7b schematically show an adjustment space 60 which can be available by way of example for adjusting a positioning unit in the longitudinal adjustment direction L and height adjustment direction H and which is limited by mechanical adjustment stops. It is already known here in the prior art to define a virtual adjustment space 61, also called adjustment window, which is significantly smaller than the adjustment space 60 and in which the positioning unit is actually adjusted. FIG. 6a and FIG. 7a each show here an adjustment space having a virtual adjustment space 61 defined at the beginning and a virtual adjustment space 62 defined at the beginning.

Figure 6B:
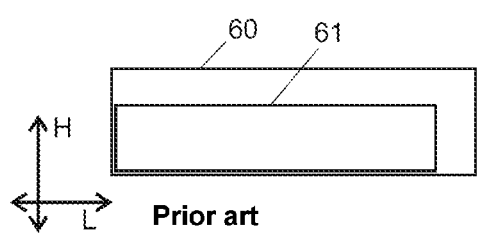

The difference between the adjustment space 60 and the virtual adjustment space 61 or the respective mechanical adjustment stop and the associated virtual adjustment stop has hitherto been selected to be of such a size, as illustrated in FIG. 6a and FIG. 6b, that an accumulated Hall count error is always smaller than the distance between the mechanical adjustment stop and the associated virtual adjustment stop. If the adjustment motor remains permanently at the mechanical adjustment stop, this results in damage or even failure of the adjustment device of the steering column.

The Hall count errors result here from the use of a Hall sensor in the adjustment motor, which, for example, emits a state "high" when the latter is switched off and a state "low" when same is switched on again. This is primarily based in the hysteresis behavior of the Hall effect latch sensors. This error is partially, but not completely, averaged out again because of the different holding positions. One reason for this is that the magnetic hysteresis behavior of the sensors is not completely symmetrical. A mechanical change in the position due to vibrations can likewise lead to a change in the signal states. The voltage supply of the sensors cannot remain permanently switched on since the specific quiescent current consumption will therefore be exceeded. If, during the switching on of the voltage supply of the Hall sensors, the level is different from the switching-off state, it is not possible to determine the direction in which the rotor of the adjustment motor has moved. To minimize this error, the voltage supply is advantageously not switched off directly after the method but rather continues to be supplied for a few 100 ms (ms: milliseconds). The Hall sensors which are commercially available and are used in direct current motors, such as the adjustment motors of the steering column, do not have any directional recognition. Springing back of a position is therefore recognized as a forward movement because the direction predefined by the motors is always assumed in the case of self-locking drives. When a second Hall sensor is used in the motor, advantageously offset by 90°, the Hall count error can be reduced, but not completely eliminated. However, this measure leads to increased component costs. An absolute position sensor system for height/length could likewise solve the problem, but is costly. If the positioning unit position determined on the basis of the motor revolutions is compared, for safety reasons, with an absolute position, for example by means of a zone sensor and/or length sensor, in particular with respect to an airbag zone and/or a comfort/stowage zone, this error must only be minimal, for example smaller than +/−1 mm to 2.5 mm as a switching off criterion.

In the case of adjustment devices with an increased maximum speed, the motor rotational speed of the adjustment motor is configured in particular with 3000 revolutions per minute. However, the resulting speed is then in particular 70 mm/s instead of 12 mm/s. The higher transmission ratio requires an increased distance between the virtual adjustment stop and mechanical adjustment stop, in particular by a factor of five to six.

Figure 7A:
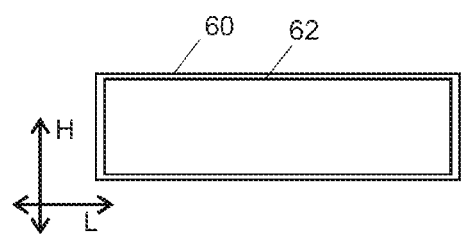
FIG. 7 shows a schematic of a technically possible adjustment space for a positioning unit with a virtual adjustment space, which can be realized according to the invention within said adjustment space, as defined at the beginning (FIG. 7a) and after a multiplicity of adjustment cycles (FIG. 7b).
Figure 7B:
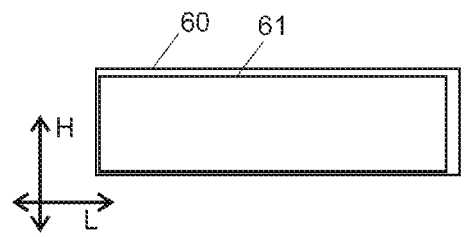

The drift in the position of the virtual adjustment space that arises after a multiplicity of adjustment processes and is shown by way of example in FIG. 6b and FIG. 7b is noticeable particularly in the case of a greater transmission ratio and even small drifts are visible with the naked eye in the case of a stowable steering column with surface-flush stowing of the steering wheel. Furthermore, one problem is that the adjustment space which is actually available is insufficiently used.

With the proposed method for adjusting the positioning unit of the steering column, the adjustment space 60 and the virtual adjustment space 62 can now advantageously be moved significantly closer together and the virtual adjustment space can therefore be enlarged, as shown in FIG. 7a and FIG. 7b. Owing to the new definition of the virtual adjustment stops, a return is advantageously also made from the state, as shown in FIG. 7b, again to the state or at least approximately to the state, as shown in FIG. 7a.

In particular, when the positioning unit is moved to an end position, the respective mechanical adjustment stop is "scanned" and the positioning unit then retracted again so as not to remain at the mechanical adjustment stop. For this adjustment, in particular a closed-loop control is provided, in particular culminating in low speeds, i.e. with few Hall counts. For such a closed-loop control, in particular for a PID controller (PID: proportional-integral-derivative), adjustment motors having at least four Hall counts per revolution are advantageous. Particularly good results can be achieved by turning back from three to five rotor revolutions. It has been shown that in this case the mechanical tension decreases and the approach impact upon approaching the mechanical adjustment stop is reduced.

The value is advantageously determined depending on the respective steering column and the respective adjustment device.

Figure 8:
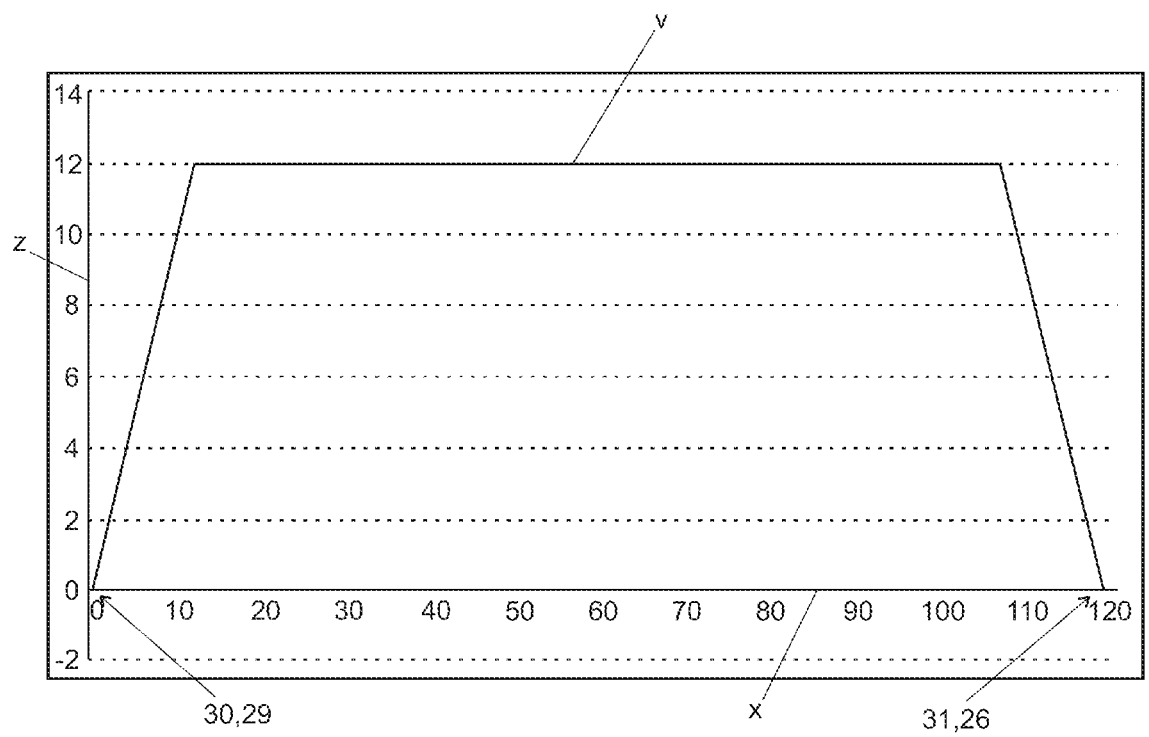
FIG. 8 shows a diagrammatic illustration of an example of an adjustment cycle for a positioning unit.
Figure 9:
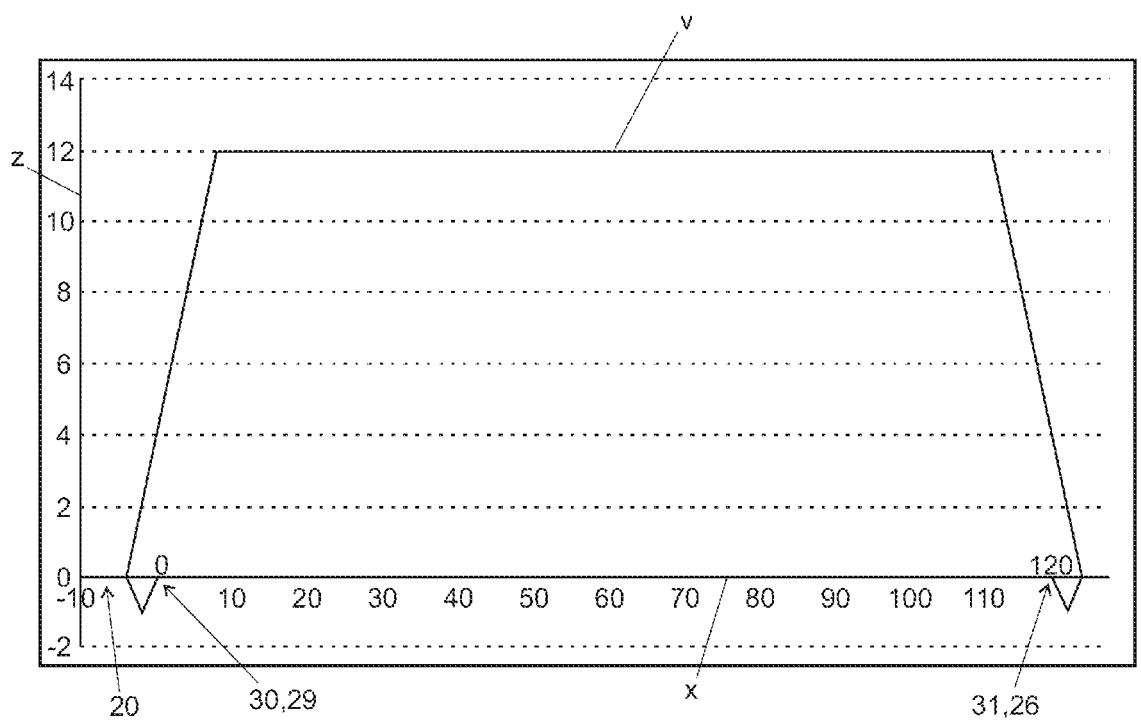
FIG. 9 shows a diagrammatic illustration of an example of an adjustment cycle for a positioning unit which is adjusted between a stowage position and an outer operator control position in accordance with the disclosure.

FIG. 8 and FIG. 9 each illustrate adjustment cycles V of the positioning unit between a stowage position 29 and an outermost operator control position 26. The position of the positioning unit is plotted in each case here on the axis X in rotor rotational movements. The number of rotor rotational movements corresponds here to the number of Hall counts. The adjustment speed is plotted in mm/s on the axis Z. The stowage position 29 corresponds here to a first virtual adjustment stop 30 and the operator control position 26 corresponds to a second virtual adjustment stop 31.

The adjustment cycle shown in FIG. 8 does not make use here of a method according to the disclosure, and therefore a critical displacement of the virtual adjustment stops 30, 31 may occur due to Hall count errors. In the case of the adjustment gradient shown in FIG. 8, the positioning unit is adjusted, for example, from the stowage position 29 into the operator control position 26. In the process, the adjustment speed initially rises continuously until an adjustment speed of 12 mm/s is reached. The adjustment speed is then reduced approximately thirteen rotor rotational movements upstream of the operator control position 26 such that the positioning unit stops at the operator control position 26.

The adjustment cycle shown in FIG. 9 makes use of a method according to the disclosure. The difference between the first mechanical adjustment stop 20 and the first virtual adjustment stop 30 is selected to be as small as possible. In the case of the adjustment cycles to one of the limit positions, i.e. to the stowage position 29 or the outermost operator control position 26, the mechanical adjustment stop 20 is deliberately approached slowly, but generally the approach does not go as far as the mechanical adjustment stop 20, and subsequently there is a movement back again. This results in the triangular negative adjustment gradient either during the approach to the stowage position 29 or during the approach to the operator control position 26.

Remaining of the adjustment device at the mechanical adjustment stop 20 and associated damage of components of the adjustment device is therefore prevented. In addition, cyclical calibration of the virtual adjustment stops is no longer necessary, but can be provided. Furthermore, the usable adjustment window, i.e. the virtual adjustment space, is maximized. The acoustic behavior during the approach to the respective limit position is also improved.

The distance between the virtual adjustment stop and mechanical adjustment stop should advantageously be chosen to be as small as possible in particular in the case of adjustment devices with a high adjustment speed. In particular, in one exemplary embodiment, five Hall counts can be selected as the distance. During the adjustment of the positioning unit into the stowage position 29, three Hall counts are adjusted via the virtual adjustment stop 30 and then back slowly again to the target position 29, advantageously a Hall count for the mechanical tolerances plus two Hall counts on the adjustment path back, in particular when a 1-count Hall sensor is used. If Hall counts are lost or additionally counted, the distance on one side from the mechanical adjustment stop 20 is reduced and said distance is detected during the passage with a continuous adjustment speed reduction, i.e. at a reduced second adjustment speed. It is therefore ensured that there is never static stopping at the mechanical adjustment stop 20. The adjustment window is recalibrated online.

Advantageously, a differentiation is provided with collision/clamping on the basis of the end position anticipated, this being relevant in particular for safety aspects. If one of the end positions 29, 26 is not approached or there is only one end position, in particular the mechanical adjustment stop 20 at the stowage position 29 can be cyclically deliberately approached. This online calibration advantageously takes place without an additional adjustment cycle for the user of the steering column or is not noticeable for the user of the motor vehicle with the installed steering column. The number of unplanned calibrations is advantageously taken into consideration in a diagnosis protocol, in particular in the control unit. With this being taken into consideration, a complete calibration can then be carried out during visiting the garage, in particular when changing the mechanical adjustment window, for example as a consequence of soiling or foreign bodies.

The exemplary embodiments illustrated in the figures and explained in conjunction therewith are used to explain the disclosure and are not limiting for it.

LIST OF REFERENCE SIGNS

1 Steering column
2 Positioning unit
3 Steering handle
4 Supporting unit
5, 6 Adjustment device
7, 8 Adjustment motor
9 Control unit
10 Fastening means of the supporting unit (4)
11 Positioning lever
12, 17 Spindle nut
13 Internal thread of the spindle nut (12)
14, 18 Threaded spindle
15, 19 Bearing housing
16 Arm
20 First mechanical adjustment stop
21 Second mechanical adjustment stop
22, 23 Mechanical adjustment stop
26, 27, 28 Operator control position
29 Stowage position
30 First virtual adjustment stop
31 Second virtual adjustment stop
40 First adjustment direction
41 Second adjustment direction
50 Holding position
55 Adjustment path
60 Adjustment space
61, 62 Virtual adjustment space
71 Part of a motor vehicle
72, 73 Pivot bearing
75, 76 Hall sensor
78 Switching element
80 Casing unit
81 Outer casing tube
82 Intermediate casing tube
83 Inner casing tube
84 Steering spindle
85 Connection portion of the steering spindle (84)
90 Position detection unit
92 Steering system
93 Steering mechanism
94 Wheel
95 Steering actuator
96 Coupling rod
98 Pinion
99 Track rod
D Distance
G Spindle axis
H Double arrow for symbolic illustration of the height adjustability
L Longitudinal axis
S Pivot axis
N Test condition not met
Y Test condition met
V Adjustment gradient between a stored operator control position and a stowage position
X Axis which indicates the position in rotor rotational movements (Hall counts)
Z Axis which indicates the adjustment speed in mm/s
100 Control unit receives command for adjusting the positioning unit into the stowage position
101 Detecting that the particular adjustment process is started
102 Adjusting the positioning unit by means of the adjustment motor in a first adjustment direction at a first adjustment speed
200 Checking whether the approach recognition condition is met
103 Reducing the first adjustment speed to a second adjustment speed
201 Checking whether the adjustment operation is an m+1th adjustment process
110 Adjusting the positioning unit at the reduced second adjustment speed in accordance with a predefined number of rotor rotational movements after the virtual adjustment stop is reached
210 Checking whether the adjustment motor has carried out the predetermined number of rotor rotational movements 211 Checking whether the positioning unit has reached the mechanical adjustment stop 120 Adjusting the positioning unit at the reduced second adjustment speed as far as the mechanical adjustment stop 220 Checking whether the positioning unit has reached the mechanical adjustment stop 104 Stopping the positioning unit for a reversal of the direction 105 Adjusting the positioning unit counter to the first adjustment direction in accordance with a predefined number of rotor rotational movements 202 Checking whether the adjustment motor has carried out the predefined number of rotor rotational movements 106 Stopping the positioning unit 107 Defining the holding position, at which the positioning unit has stopped, as the new virtual adjustment stop

What is claimed is:

1. A method for adjusting a positioning unit of an electrically adjustable steering column for a motor vehicle, wherein the steering column comprises a supporting unit, by which the positioning unit is adjustably held, an adjustment device with an adjustment motor, said adjustment device being configured for adjusting the positioning unit relative to the supporting unit, and a mechanical adjustment stop, which mechanically limits an adjustment of the positioning unit in a first adjustment direction, wherein a virtual adjustment stop for the positioning unit is defined, said adjustment stop being located upstream of the mechanical adjustment stop with respect to the first adjustment direction, and wherein the positioning unit is adjusted by means of the adjustment motor in the first adjustment direction at a first adjustment speed, comprising: adjusting the positioning unit until beyond the virtual adjustment stop;

stopping the positioning unit for a reversal of the direction;

adjusted the positioning unit counter to the first adjustment direction as far as a holding position; and stopping the positioning unit at the holding position.

2. The method of claim 1, wherein the adjustment of the positioning unit in accordance with the defined first stipulation is broken off when the positioning unit reaches the mechanical adjustment stop during the adjustment in accordance with the defined first stipulation.

3. The method of claim 1, wherein the holding position is defined as a new virtual adjustment stop, and therefore the new virtual adjustment stop is defined as the virtual adjustment stop for the positioning unit.

4. The method of claim 1, wherein the first adjustment speed is reduced to a second adjustment speed when a defined approach recognition condition has been recognized as being met, wherein the positioning unit is adjusted beyond the virtual adjustment stop at the second adjustment speed in accordance with the defined first stipulation.

5. The method of claim 1, wherein the approach recognition condition is recognized as being met when the positioning unit has reached a defined distance (D) from the virtual adjustment stop.

6. The method of claim 1, wherein a rotation of a rotor of the adjustment motor by a defined revolution portion during the adjustment of the positioning unit is detected as a rotational movement of the rotor.

7. The method of claim 6, wherein after the positioning unit is stopped for the reversal of the direction, the positioning unit is adjusted further for a predefined first number of rotational movements of the rotor.

8. The method of claim 1, wherein the positioning unit is adjusted as far as the mechanical adjustments stop.

9. The method of claim 6, wherein after the virtual adjustment stop is reached, the positioning unit is adjusted further for a predefined second number of rotational movements of the rotor.

10. The method of claim 9, wherein the first number of rotational movements of the rotor is equal to the second number of rotational movements of the rotor.

11. The method of claim 1, wherein the loading of the adjustment motor during the adjustment of the positioning unit is detected and evaluated, wherein, when a predefined threshold value for the loading of the adjustment motor is exceeded, it is recognized that the positioning unit has reached the mechanical adjustment stop.

12. The method of claim 1, wherein the positioning unit is adjusted as far as the mechanical adjustments stop one more time than the positioning unit is adjusted further for a predefined second number of rotational movements of the rotor after the virtual adjustment stop is reached.

13. An electrically adjustable steering column for a motor vehicle, comprising:
a supporting unit, by which a positioning unit is adjustably held;
an adjustment device with an adjustment motor, which adjustment device is configured for adjusting the positioning unit relative to the supporting unit;
a mechanical adjustment stop mechanically limiting an adjustment of the positioning unit in a first adjustment direction;
a control unit configured to activate the adjustment motor;
a virtual adjustment stop located upstream of the mechanical adjustment stop, with respect to the first adjustment direction, wherein the steering column is configured for adjusting the positioning unit as claimed in claim 1.

14. The steering column of claim 13, wherein a position detection unit configured to detect the position of the positioning unit relative to the supporting unit is connected to the control unit in terms of communication.

15. The steering column of claim 13, wherein a sensor unit which configured to detect a rotation of a rotor of the adjustment motor by a defined revolution portion during the adjustment of the positioning unit in each case as rotational movement of the rotor is connected to the control unit in terms of communication.

16. The steering column of claim 15, further comprising a counter configured to count the number of rotational movements of the rotor, wherein the counter is connected to the control unit in terms of communication.

17. The steering column of claim 13, wherein a motor loading detection unit configured to detect loading of the adjustment motor during the adjustment of the positioning unit and to evaluate same in respect of exceeding a predefined threshold value for the loading of the adjustment motor, is communicatively connected to the control unit.

* * * * *